US008843075B2

(12) United States Patent
Kenkel et al.

(10) Patent No.: US 8,843,075 B2
(45) Date of Patent: Sep. 23, 2014

(54) SELF-DISCOVERY OF AN RF CONFIGURATION FOR A WIRELESS SYSTEM

(75) Inventors: Mark Allen Kenkel, Schaumburg, IL (US); Christopher M. Meyer, Grayslake, IL (US)

(73) Assignee: Shure Acquisition Holdings, Inc., Niles, IL (US)

(*) Notice: Subject to any disclaimer, the term of this patent is extended or adjusted under 35 U.S.C. 154(b) by 852 days.

(21) Appl. No.: 12/626,105

(22) Filed: Nov. 25, 2009

(65) Prior Publication Data

US 2011/0080847 A1   Apr. 7, 2011

Related U.S. Application Data

(60) Provisional application No. 61/249,438, filed on Oct. 7, 2009.

(51) Int. Cl.
*H04B 17/00* (2006.01)
*H04B 1/20* (2006.01)

(52) U.S. Cl.
CPC ............ *H04B 1/205* (2013.01); *H04R 2410/00* (2013.01); *H04R 2420/07* (2013.01)
USPC ........ 455/67.11; 455/313; 455/323; 455/337; 370/254

(58) Field of Classification Search
CPC .................................................. H04R 2420/07
USPC ................ 455/67.11, 313, 323, 337; 370/254
See application file for complete search history.

(56) References Cited

U.S. PATENT DOCUMENTS

| 2,962,659 | A | * | 11/1960 | Neill .............................. 324/540 |
| 4,314,373 | A | | 2/1982 | Sellers |
| 4,955,021 | A | | 9/1990 | Wei |
| 6,801,767 | B1 | | 10/2004 | Schwartz et al. |
| 8,219,374 | B1 | * | 7/2012 | Batarseh et al. ................. 703/13 |

(Continued)

FOREIGN PATENT DOCUMENTS

| EP | 1422884 A1 | 5/2004 |
| EP | 2219322 A1 | 8/2010 |
| EP | 2469776 A1 | 6/2012 |

OTHER PUBLICATIONS

International Search Report from related PCT Application PCT/US2010/051649 mailed on Feb. 8, 2011.

(Continued)

*Primary Examiner* — Hsin-Chun Liao
(74) *Attorney, Agent, or Firm* — Banner & Witcoff, Ltd.

(57) ABSTRACT

A RF distribution system determines its configuration and verifies the consistency of the determined configuration. Based on a device identifier, the RF distribution system may individually instruct each RF component to provide a generated signal. Consequently, a first RF component may modulate a signal on a first port. If a second RF component detects a modulated signal on a second port, then the RF distribution system deems that the two RF components are connected together. The procedure may be repeated for the remaining RF components so that the RF configuration of the RF distribution system may be determined. The determined RF configuration may be further verified for operational consistency. The RF distribution system may also scan a RF spectrum, determine a set of frequencies that provides RF compatibility with the RF distribution system based on the scanning, and configure the RF components in accordance with the set of frequencies.

23 Claims, 7 Drawing Sheets

(56) References Cited

U.S. PATENT DOCUMENTS

| | | |
|---|---|---|
| 2002/0023234 A1* | 2/2002 | Berman et al. ............... 713/300 |
| 2003/0157916 A1 | 8/2003 | Kamimura |
| 2004/0131201 A1 | 7/2004 | Hundal |
| 2004/0170128 A1* | 9/2004 | Takamichi .................... 370/245 |
| 2005/0207352 A1* | 9/2005 | Schmidt ........................ 370/254 |
| 2008/0049627 A1 | 2/2008 | Nordin |
| 2009/0009296 A1 | 1/2009 | Shafer |
| 2010/0325671 A1* | 12/2010 | Jaramillo ....................... 725/72 |
| 2011/0080847 A1 | 4/2011 | Kenkel et al. |
| 2011/0249831 A1 | 10/2011 | Bellamy |
| 2012/0051302 A1 | 3/2012 | Seki |
| 2012/0120313 A1 | 5/2012 | Green et al. |

OTHER PUBLICATIONS

International Search Report from related PCT Application PCT/US2013/051870 mailed on Feb. 25, 2014; pp. 1-18.
Partial International Search Report from related PCT Application PCT/US2013/051870 mailed on Nov. 7, 2013; pp. 1-5.

* cited by examiner

SELF-DISCOVERY OF AN RF CONFIGURATION FOR A WIRELESS SYSTEM

This application claims priority to provisional Application Ser. No. 61/249,438 filed Oct. 7, 2009, which is incorporated by reference in its entirety herein.

BACKGROUND

Wireless microphone receivers are often connected to a coaxial antenna distribution system. The receivers are typically connected to a distribution amplifier and may be connected to one another in a cascaded fashion though a series of coaxial cables. The assigned frequency ranges of the receivers may be controlled though networking protocols such as Ethernet. If the distribution amplifier and the associated receivers are configured to different filter bands, the mismatch may cause poor or inoperable system performance. Moreover, the distribution system may not operate properly if the components are not correctly connected.

SUMMARY

This summary is provided to introduce a selection of concepts in a simplified form that are further described below in the Detailed Description. This Summary is not intended to identify key features or essential features of the disclosure.

A RF distribution system (e.g., wireless microphone receivers, scanner, antenna distribution system, or any system containing some or all of the components described herein) determines its configuration and verifies the consistency of the determined configuration. A first RF component in the distribution system modulates a signal on a first port. If a second RF component detects a modulated signal on a second port, then a processor deems that the two RF components are connected together. When the configuration has been determined by the processor, the RF distribution may further verify whether the configuration is consistent (e.g., whether connected components operate on the same band and whether all components are connected to at least one other component).

With another aspect of the disclosure, a RF distribution system instructs a first RF component of a RF distribution system to provide a generated signal. If an indication from a second RF component is detected, the RF distribution system determines that the first RF component and the second RF component are electrically connected. The procedure is repeated for the remaining RF components so that the RF configuration of the RF distribution system may be determined. The first RF component may modulate the generated signal by changing a DC voltage level or with a tone.

With another aspect of the disclosure, the RF distribution system may individually instruct each RF component to provide a generated signal based on a device identifier of each RF component. The device identifier may be obtained from device addressing supported by the supported protocol, including Ethernet, USB, and Zigbee.

With another aspect of the disclosure, the determined RF configuration may be verified for operational consistency. For example, verification may verify consistency of the bands for connected RF components, verify that each RF component in the RF distribution system is connected to another component, and verify that each RF component is connected to a preceding RF component and a succeeding RF component when the RF component is not an endpoint of the RF configuration.

With another aspect of the invention, a RF distribution system scans a RF spectrum, determines a set of frequencies that provides RF compatibility with the RF distribution system based on the scanning, and configures the RF components in accordance with the set of frequencies.

BRIEF DESCRIPTION OF THE DRAWINGS

A more complete understanding of the exemplary embodiments of the present invention and the advantages thereof may be acquired by referring to the following description in consideration of the accompanying drawings, in which like reference numbers indicate like features and wherein.

DETAILED DESCRIPTION

In the following description of the various exemplary embodiments, reference is made to the accompanying drawings which form a part hereof, and in which is shown by way of illustration various embodiments in which the invention may be practiced. It is to be understood that other embodiments may be utilized and structural and functional modifications may be made without departing from the scope of the present invention.

Aspects of the disclosure relate to determining the configuration of a radio frequency (RF) distribution system (e.g., wireless microphone receivers, scanner, antenna distribution system, or any system containing some or all of the components described herein) and to verify the consistency of the determined configuration. A first RF component in the distribution system modulates a signal on a first port. If a second RF component detects a modulated signal on a second port, then a processor deems that the two RF components are connected together. When the configuration has been determined by the processor, the process may further verify whether the configuration is consistent (e.g., whether connected components operate on the same band and whether all components are connected to at least another component.

Figure 1:
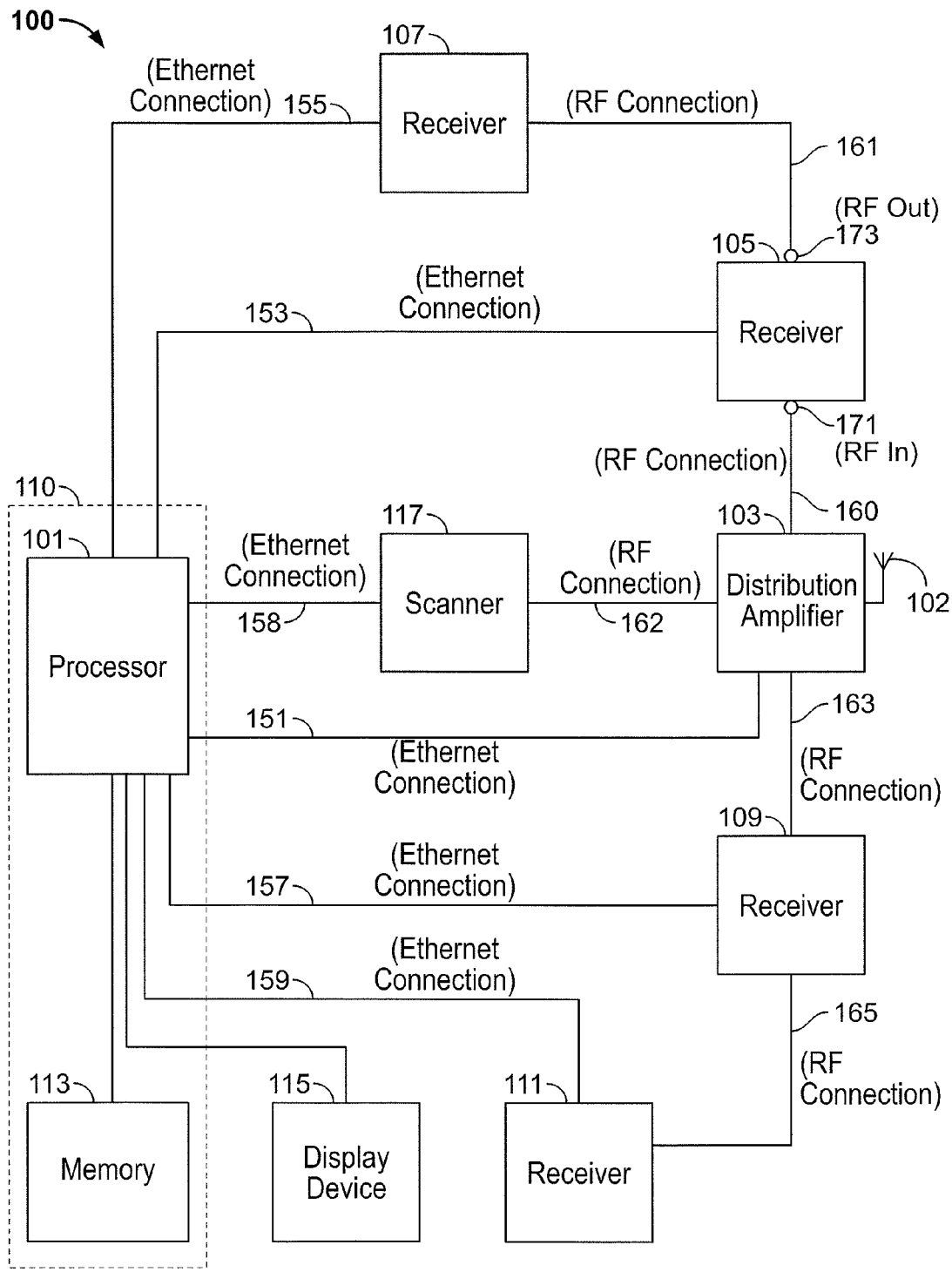
FIG. 1 shows an apparatus for supporting a wireless system in accordance with an exemplary embodiment of the invention.

FIG. 1 shows apparatus for supporting a wireless system in accordance with an exemplary embodiment of the invention. Microphone receivers 105, 107, 109, and 111 are connected in a coaxial antenna distribution system to antenna 102 through distribution amplifier 103. Receivers 105, 107, 109, and 111 and distribution amplifier 103 may be controlled though networking protocols, e.g., Ethernet, by processor 101 through Ethernet connections 153, 155, 157, 159, and 151, respectively. While FIG. 1 shows separate Ethernet connections, Ethernet connectivity is often supported through a daisy chain configuration, in which Ethernet connection is obtained through chaining devices and assigning unique addresses to each device.

If distribution amplifier 103 and associated receivers 105, 107, 109, and 111 are configured to different frequency ranges or bands (which may be referred to as "bands"), a mismatch may cause poor or inoperable system performance. A voltage source may be presented at the antenna ports of receivers 105, 107, 109, and 111 (e.g., input RF port 171 of receiver 105) and distribution amplifier 103 for use in driving line amplifiers and powered antennas. A DC voltage may be used to modulate (e.g., ON/OFF or multiple voltage levels) with a given network system command issued by processor 101 to a specific receiver through the Ethernet connection. With embodiments, the DC voltage is modulated by changing the DC component of a signal between an operational voltage level (e.g., 12 volts) and an intermediate voltage level (e.g., 10.5 volts or 13.5 volts). The modulated DC voltage may be detected by upstream receivers (e.g., at output RF port 173 if receiver 107 is modulating a signal at its input RF port), and a message may be sent over the Ethernet network by the detecting receiver that informs system processor 101 that an RF link (e.g., RF connection 160, 161, 162, 163 or 165) between these RF components has been determined (discovered). If RF components are tuned to different bands and connected together, the RF distribution system 100 may inform the user of the mismatch through system software that may display an indication on display device 115.

Other embodiments may modulate the signal at input RF port 171 in a different fashion. For example, a signal may be modulated with one or more tones or a serial/duplex data stream.

Some embodiments may send information on the signal at port 171 utilizing a simplex/duplex digital data stream (e.g., with a UART), a low speed simplex data stream, or a single pulse identifier (e.g., no formatted data with only a single identifier bit).

With the embodiment shown in FIG. 1, a receiver (e.g., receiver 105) modulates a signal on its input RF port (e.g., port 171) so that a preceding (upstream) RF component (receiver or distribution amplifier, e.g., amplifier 103) detects the modulated signal when the components are connected together through an RF link. However, with other embodiments, a RF component may modulate its output RF port (e.g., port 173) so that the successive (downstream) RF component (e.g., receiver 107) may detect the modulated signal at its input RF port.

RF distribution system 100 may also automatically configure receivers 103, 105, 107, and 109 for assigning operating frequencies within the same band. The configuration procedure may be performed after scanning the band or bands by scanner 117 and determining the set of frequencies that provide the best RF compatibility. Scanner 117 accesses the RF spectrum from distribution amplifier 103 through RF link 162 and provides information about the spectrum to processor 101 through Ethernet connection 158. Receivers that are cascaded together (e.g., receivers 105 and 107) may then be configured to the same band and programmed to individual channels within that band. System setup may appear to the user as a single operation that determines the system configuration, scans for clear frequencies, calculates compatible frequencies within frequency bands, and configures receivers to the calculated frequencies (channels).

RF distribution system 100 may determine the RF configuration at system initialization, when a RF component is added to system 100, or during operation of system 100. System 100 may be configured in response to an input from a user, cyclically (e.g., once per predetermined time interval), or automatically (e.g., when the system is initialized or when a RF component is added to RF distribution system 100).

Processor 101 may instruct an RF component to modulate a signal at its input RF port by sending a message to the RF component over the Ethernet network. Consequently, the RF component that is connected to the instructed RF component should send a message to processor 101 over the Ethernet network, informing processor 101 that the modulated signal was detected.

Processor 101 may execute computer executable instructions from a computer-readable medium, e.g., memory 113, in order perform a discovery process (any or all of the processes described herein). With some embodiments, an apparatus 110 may comprise processor 101 and memory 113. Apparatus 110 may include one or more application-specific integrated circuits (ASICs), complex programmable logic devices (CPLDs), field-programmable gate arrays (FPGAs), or other integrated circuits. Computer storage media may include volatile and nonvolatile, removable and non-removable media implemented in any method or technology for storage of information such as computer readable instructions, data structures, program modules or other data. Computer storage media include, but may not be limited to, random access memory (RAM), read only memory (ROM), electronically erasable programmable read only memory (EEPROM), flash memory or other memory technology, CD-ROM, digital versatile disks (DVD) or other optical disk storage, magnetic cassettes, magnetic tape, magnetic disk storage or other magnetic storage devices, or any other medium that can be used to store the desired information and that can be accessed by processor 101. The executable instructions may carry out any or all of the method steps described herein. With some embodiments, apparatus 110 (e.g., a laptop computer) may be external to the receivers, scanner, and distribution amplifiers as shown in FIG. 1. With other embodiments, apparatus 110 may be imbedded into each of the devices (e.g., receivers 105 and 107 and/or distribution amplifier 103) so that an external computer is not necessarily required.

Apparatus 100 or portions of apparatus 100 may be implemented as one or more application-specific integrated circuits (ASICs), complex programmable logic devices (CPLDs), field-programmable gate arrays (FPGAs), or other integrated circuits having instructions for performing operations as described in connection with one or more of any of the embodiments described herein. Said instructions may be software and/or firmware instructions stored in a machine-readable medium and/or may be hard-coded as a series of logic gates and/or state machine circuits in one or more integrated circuits and/or in one or more integrated circuits in combination with other circuit elements.

Figure 2:
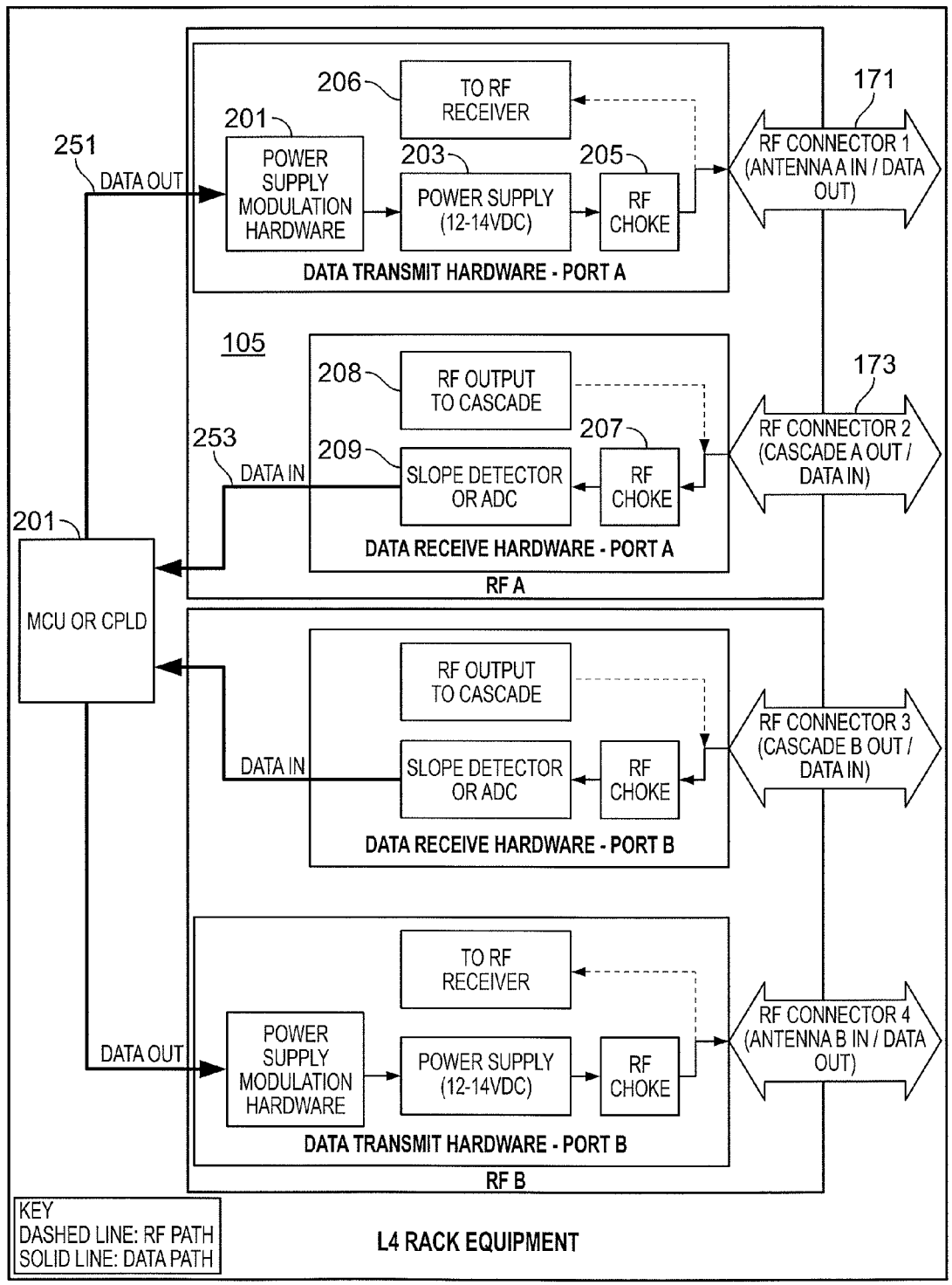
FIG. 2 shows a block diagram of a receiver in accordance with an exemplary embodiment of the invention.

FIG. 2 shows a block diagram of receiver 105 in accordance with an exemplary embodiment of the invention. When instructed by processor 201 through Ethernet connection 153 (corresponding to message 251), receiver 105 modulates the signal on input RF port 171. In order to modulate the signal, power supply modulation hardware 201 changes the voltage levels of power supply 203. RF choke 205 isolates power supply 203 from the RF signal component that is processed by RF circuitry 206. The upstream receiver (not shown) should detect the modulated signal Receiver 105 also includes detect circuitry to detect a modulated signal from a downstream receiver (not shown). In order to detect a modulated signal through output RF port 173, detector 209 detects a DC voltage transition in the modulated signal and reports the occurrence to processor 201 through Ethernet connection 153 (corresponding to message 253). RF choke 207 provides RF isolation for detector 209 when RF cascade circuitry 208 provides the RF signal to the downstream receiver. Detector 209 may assume different forms, including a slope detector or an analog-to-digital converter (ADC).

Figure 3:
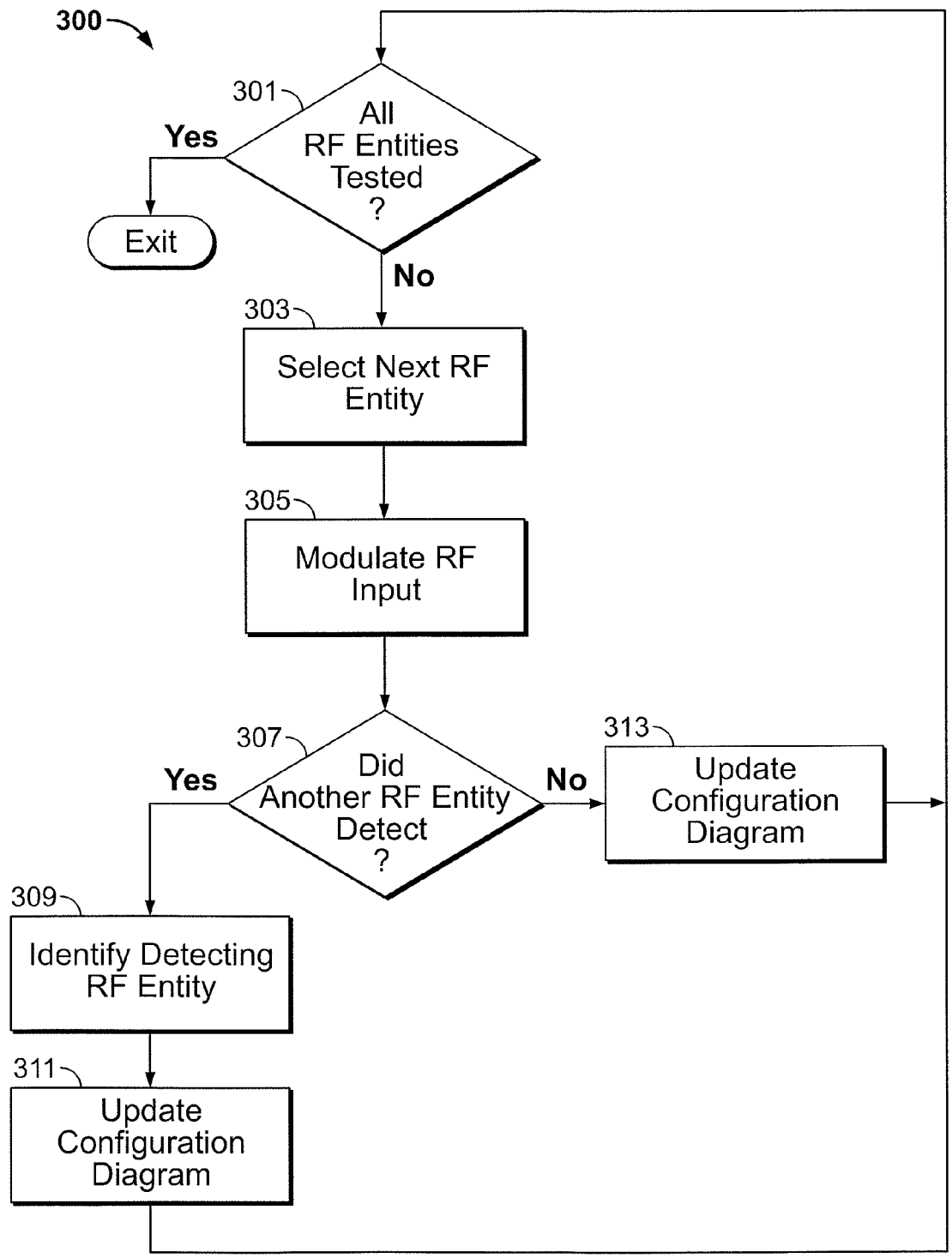
FIG. 3 shows a flow diagram for performing a self-discovery of a RF configuration for a wireless system in accordance with an exemplary embodiment of the invention.

FIG. 3 shows flow diagram 300 for performing a self-discovery of a RF configuration for RF distribution system 100 in accordance with an exemplary embodiment of the invention. In block 301, process 300 determines whether all of the RF entities (e.g., receivers, distribution amplifies, and scanners) have been tested. If not, the next RF entity is determined in block 303. With some embodiments, the next RF entity is determined from the assigned media access control (MAC) address. The next RF entity may be selected by different criteria, e.g., by selecting the MAC randomly or by selecting the MAC address in a predetermined order. With some embodiments, random selection of the MAC address may be approximated by a pseudo-random process.

As described above, the use of MAC addressing serves as a device identifier. However, other embodiments may use other forms of device-specific identifiers. For example, some embodiments may support a different protocol (e.g., USB or Zigbee) other than Ethernet.

In block 305, processor 101 instructs the selected RF entity to modulate the signal at its input RF port. In blocks 307, 309, and 311, the upstream RF entity should detect and report the modulated signal except when the instructed RF entity is a distribution amplifier (e.g., distribution amplifier 103 as shown in FIG. 1) that is connected to an antenna (e.g., antenna 102). Otherwise, a configuration error indication may be generated by processor 101 if none of the RF entities (components) detects the modulated signal.

The results of process 300 may be used in conjunction with further processing in which a diagram of RF distribution system 100 may be displayed on display device 115 (as shown in FIG. 1). The diagram may include hardware connections between RF entities and may also indicate whether there is an error in the RF configuration (e.g., when two receivers for different bands are connected or when a receiver is not connected to a distribution amplifier or another receiver). The analysis facilitates confirmation of correct system connections and may detect broken RF cables.

Figure 4:
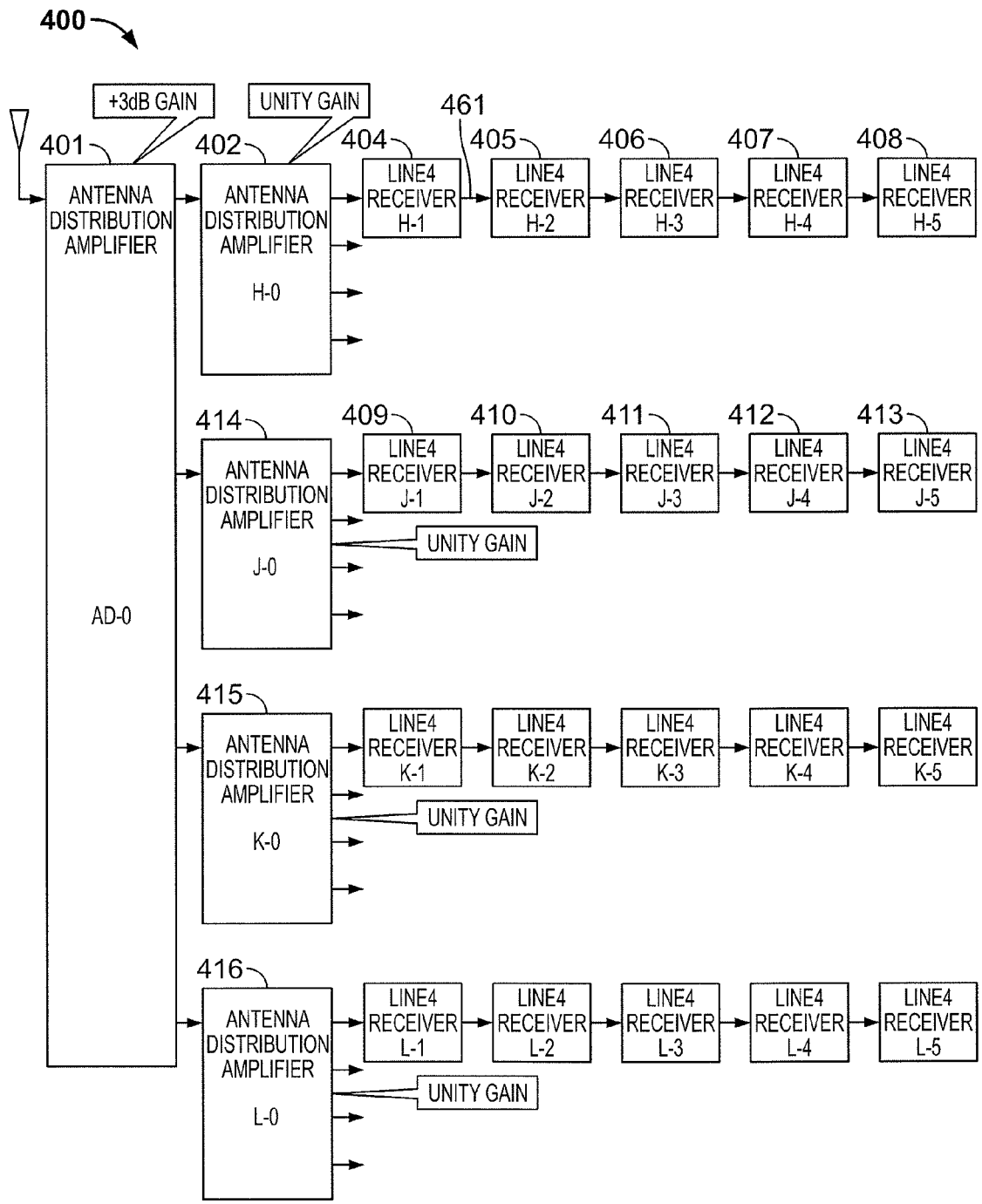
FIG. 4 shows a RF configuration for a RF distribution system in accordance with an exemplary embodiment of the invention.
Figure 5:
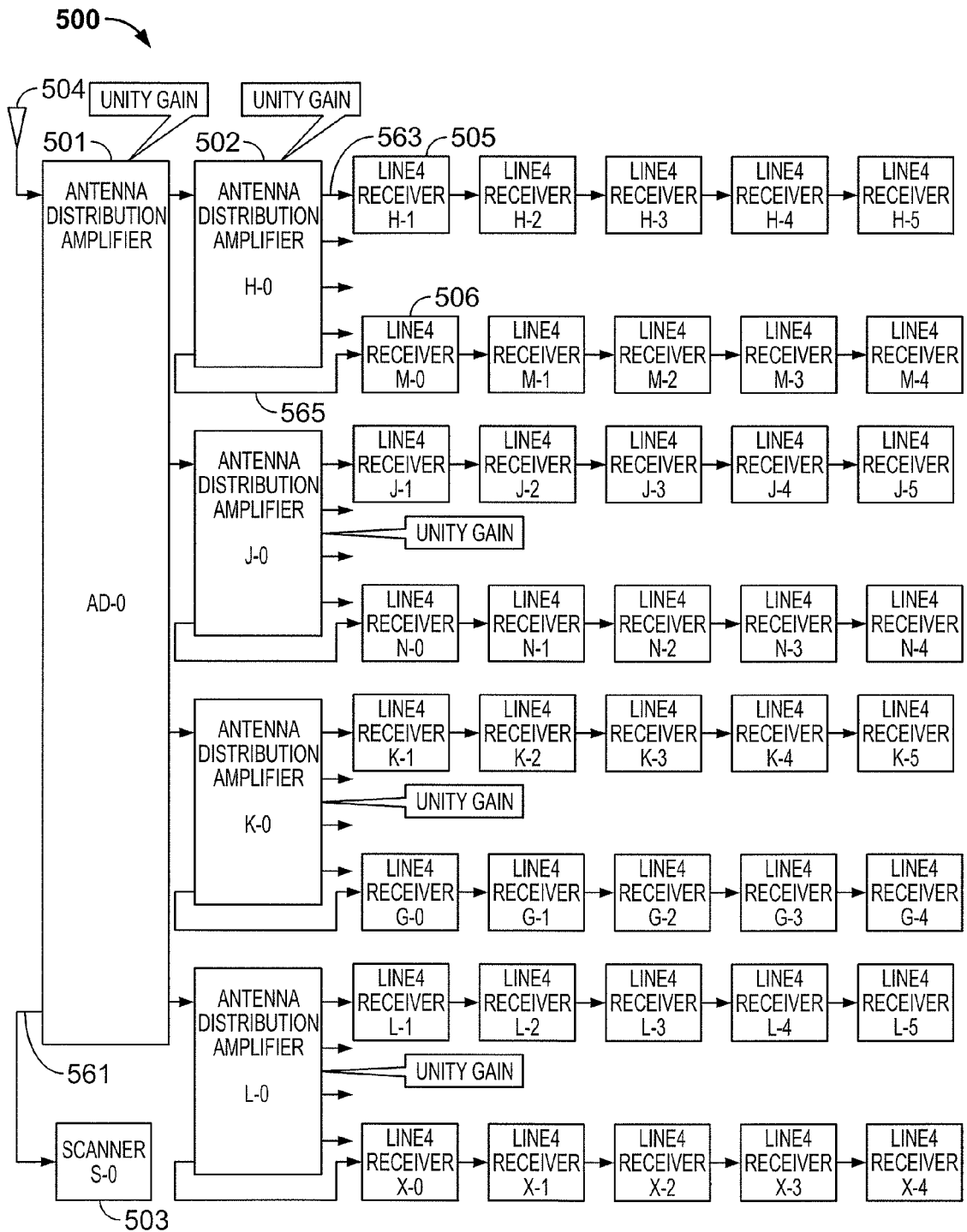
FIG. 5 shows a RF configuration for a wireless system in accordance with an exemplary embodiment of the invention.
Figure 6:
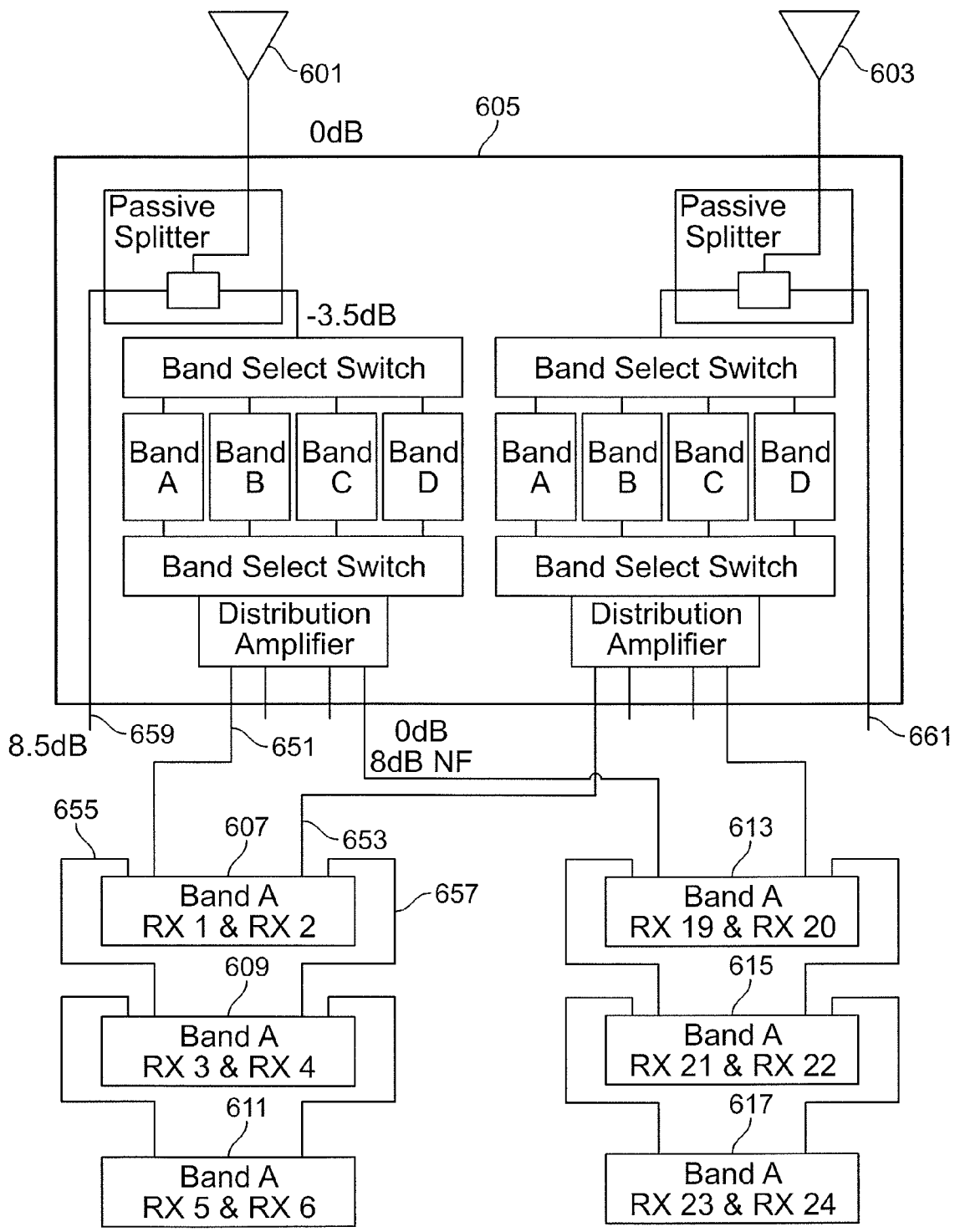
FIG. 6 shows a block diagram of a distribution amplifier that is connected to wireless receivers in accordance with an exemplary embodiment of the invention.

FIG. 4 shows RF configuration 400 for a wireless system in accordance with an exemplary embodiment of the invention. With an exemplary embodiment, bands H, J, K, and L correspond to 470 to 518 MHz, 518 to 578 MHz, 578 to 638 MHz, and 638 to 698 MHz, respectively. The outputs of a distribution amplifier may be set to one of the 4 bands or to wideband operation, i.e., the output spans the entire range from 470 to 698 MHz. Referring to FIG. 6, filter bands A, B, C and D as shown for distribution amplifier 605 correspond to filter bands H, J, K and L as shown in FIG. 4. Distribution amplifier 401 is configured to pass the entire filtered band (470-698 MHz). Distribution amplifiers 402, 414, 415, and 416 (H-0, J-0, K-0, and L-0, respectively) are set to sub-bands of 470-698 MHz as described above. Each wireless microphone receiver (e.g., receivers 404-413), antenna distribution amplifier (e.g., amplifiers 401 and 402), and scanner (scanner 503 as shown in FIG. 5) has a 12-15 VDC signal component present at the antenna input port. The DC voltage is typically used to drive line amplifiers and power antennas. With some embodiments, RF loop through (cascade) ports may not have a DC voltage source available. The DC voltage at the antenna ports may be toggled off and on (to modulate its operating voltage) during system setup via network command. If receivers are cascaded, the DC voltage from a receiver's antenna port is presented to the loop through port of the preceding receiver. The RF loop through port may sense the presence and modulation of the DC and thus may be indicative of the RF connection chain configuration.

For example, if the DC on the input antenna port of receiver (H-2) 405 is toggled off and on, the modulated signal should be sensed by the loop through port of receiver (H-1) 404 and reported to the network. The reported indication informs processor 101 that receivers share 405 and 404 RF connection 461 and should be set to operate within the same filter band. In a similar manner, each receiver and distribution amplifier in the network has its ports toggled one at a time. If a change in DC level is not sensed by another RF entity, the entity being toggled is assumed to be at the antenna end of the chain (corresponding to distribution amplifier 401). In the case of diversity systems, when a change is sensed only by one antenna port, a broken or missing RF cable may be detected.

A message may be reported via the computer network indicating the configuration of the RF connections and issuing warnings about broken RF cables. Receivers that are chained together should be set to the same frequency band because the RF signals of the receivers have been filtered to that band by the first receiver in the chain. If a distribution amplifier is band-selected, each receiver serviced by that distribution amplifier should be set to frequencies within the selected band. A distribution amplifier (e.g., amplifier 401 as shown in FIG. 4) may also be set to wideband operation (simultaneously passing all signals within bands A, B, C, and D as shown with distribution amplifier 605 in FIG. 6). Each cascaded distribution amplifier (e.g., amplifier 402) may be separately band selected and support four receiver chains, where each chain is associated with the same frequency band.

The loop-through of an antenna distribution amplifier may also be set to wideband operation in order to support a wideband scanner (not explicitly shown in FIG. 4 but as discussed with FIG. 5).

With some embodiments, distribution amplifiers (e.g., amplifiers 401 and 402) may be cascaded to increase the number of receivers that can be supported by RF distribution system 100. With some embodiments, the gain of the second distribution amplifier (e.g., amplifier 402) is typically set to unity.

FIG. 5 shows RF configuration 500 for a wireless system in accordance with an exemplary embodiment of the invention. Configuration utilizes scanner 503 that scans the frequency spectrum of the input signal from antenna 504 through distribution amplifier 501 and RF connection 561. Distribution amplifier 501 provides both filtered outputs (e.g., corresponding to output 651 as shown in FIG. 6) as well as an unfiltered output (e.g., corresponding to output 659). Scanner 503 analyzes the unfiltered output through connection 561 and reports the results to processor 101 (as shown in FIG. 1) as previously discussed.

Distribution amplifier 501 is cascaded to distribution amplifier 502, which provides filtered signals (e.g., to receiver 505 through connection 563) and unfiltered signals (e.g., receiver 506 through connection 565).

FIG. 6 shows a block diagram of distribution amplifier 605 that is connected to receiver units 607, 609, 611, 613, 615, and 617 in accordance with an exemplary embodiment of the invention. Distribution amplifier 605 receives signals through antennas 601 and 603 and provides filtered RF outputs to each receiver in order to support diversity reception. For example receiver unit 607 (comprising receivers 1 and 2) is provided two RF input signals through RF connections 651 and 653. With some embodiments, receivers 1 and 2 are internally cascaded within receiver unit 607 and set to the same frequency band. With other embodiments, receivers 1 and 2 may be externally cascaded through a coaxial cable. Receiver unit 609 is cascaded to receiver unit 607 through RF connections 655 and 657. Receiver unit 611 is further cascaded from receiver unit 609.

As previously discussed, distribution amplifier 605 also provides unfiltered RF signals through connections 659 and 661 in order to support additional receivers or a scanner.

Figure 7:
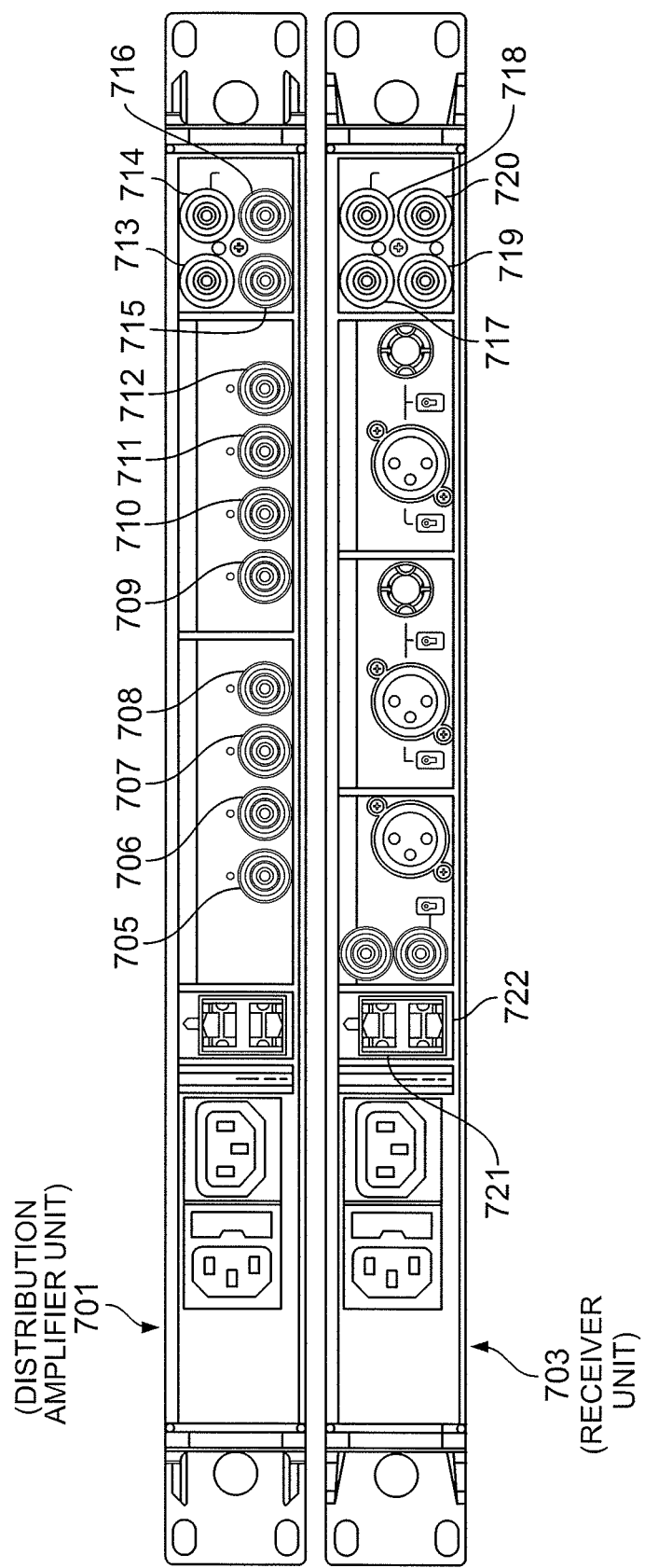
FIG. 7 shows back panels of a distribution amplifier unit and receiver unit in accordance with an exemplary embodiment of the invention.

FIG. 7 shows back panels 701 and 703 for distribution amplifier unit 605 and receiver unit 607, respectively in accordance with an exemplary embodiment of the invention. While FIG. 7 shows only one distribution amplifier unit and one receiver unit, a plurality of distribution amplifier units and receivers may be configured into system 100, in which the units may be stacked in one or more racks. For example, some exemplary configurations may support over 100 channels and thus over 50 dual channel receiver units.

Two antennas may be connected to BNC connectors 713 and 714 of back panel 701 in order to provide RF diversity. Both filtered RF outputs (supporting diversity pairs and corresponding to BNC connectors 705 and 709, 706 and 710, 707 and 711, and 708 and 712) and unfiltered RF outputs (corresponding to BNC connectors 715 and 716) may be connected to receiver units through coaxial cables.

Back panel 703 corresponds to two receivers (channels), where Ethernet connectivity is established by daisy chaining through connectors 721 and 722. Diversity input RF signals are provided through BNC connectors 717 and 718 and are cascaded to another receiver unit through BNC connectors 719 and 720.

While some embodiments have been described with respect to specific examples, other embodiments include numerous variations and permutations of the above described systems and techniques.

The following are exemplary embodiments.

A method (e.g., RF distribution system) comprising in combination one or more of the followings aspects:
  instructing a first RF component (e.g., a first wireless receiver) to modulate signal on a first port of the first RF component
    modulating a signal by changing DC voltage (e.g., ON/OFF or between an operational voltage level and an intermediate voltage level) on a RF input port
    modulating a signal with a tone
    serial data (simplex or duplex)
  receiving an indication from a second RF component (e.g. a second wireless receiver) that a modulated signal is detected on a second port of the second RF component
    detecting a modulated signal on a cascaded RF output port of the second RF component
  repeating the instructing for remaining RF components system so that the RF configuration is determined
    determining the next RF component based on a MAC address
  verifying the determined system configuration for operational consistency
    verifying the consistency of the bands for connected RF components
    verifying that a component is connected to another component An apparatus (e.g., RF distribution system) comprising in combination one or more of the followings aspects:
  a processor (and optionally a memory and communications interface) configured to cause the apparatus to
    instruct a first RF component (e.g., a first wireless receiver) to modulate signal on a first port of the first RF component
      modulate a signal by changing DC voltage (e.g., ON/OFF or between an operational voltage level and an intermediate voltage level) on RF input port
      modulate a signal with a tone
      serial data (simplex or duplex)
    receive an indication from a second RF component (e.g. a second wireless receiver) that a modulated signal is detected on a second port of the second RF component
      detect a modulated signal on a cascaded RF output port of the second RF component
    repeat the instructing for remaining RF components so that the system configuration is determined
      determine the next RF component based on a MAC address
    verify the determined system configuration for operational consistency
      verify the consistency of the bands for connected RF components
      verify that a component is connected to another component A computer-readable medium that contains computer readable instructions that cause an apparatus (e.g., RF distribution system) to perform in combination one or more of the followings aspects comprising:
  instructing a first RF component (e.g., a first wireless receiver) to modulate signal on a first port of the first RF component
    modulating a signal by changing DC voltage (e.g., ON/OFF or between an operational voltage level and an intermediate voltage level) on RF input port
    modulating a signal with a tone
    serial data (simplex or duplex)
  receiving an indication from a second RF component (e.g., a second wireless receiver) that a modulated signal is detected on a second port of the second RF component
    detecting modulated signal on a cascaded RF output port of the second RF component
  repeating the instructing for remaining RF components so that the system configuration is determined
    determining the next RF component based on a MAC address
  verify the determined system configuration for operational consistency
    verify consistency of the bands for connected RF components
    verify that a component is connected to another component

What is claimed is:

1. A method comprising:
  instructing a first radio frequency (RF) component of a RF distribution system to provide a generated signal through an RF port;
  receiving an indication from a second RF component when the generated signal is detected, the indication indicative that the first RF component and the second RF component are electrically connected through the RF port;
  determining a next RF component based on a device identifier of the next RF component;
  repeating the instructing, the receiving, and the determining the next RF component steps for remaining RF components of the RF distribution system;
  determining a RF configuration of the RF distribution system based on the instructing, the receiving, and the repeating steps;

in response to the determining, automatically detecting when a detected error occurs in the RF configuration of the RF distribution system; and displaying a graphical representation of the RF configuration with an error indication of the detected error.

2. The method of claim 1, further comprising:
modulating the generated signal by changing a DC voltage level of the generated signal.

3. The method of claim 1, further comprising:
modulating the generated signal with a modulating signal, the modulating signal characterized by a tone.

4. The method of claim 1, wherein the device identifier comprises a media access control (MAC) address.

5. The method of claim 4, further comprising:
selecting the MAC address with an approximate random process.

6. The method of claim 1, further comprising:
verifying the determined RF configuration for operational consistency.

7. The method of claim 6, wherein the verifying comprises:
verifying consistency of the bands for connected RF components.

8. The method of claim 6, wherein the verifying comprises:
verifying that each RF component in the RF distribution system is connected to another component.

9. The method of claim 1, wherein the verifying comprises:
verifying that each RF component is connected to a preceding RF component and a succeeding RF component through corresponding RF ports when each said RF component is not an endpoint of the RF configuration.

10. The method of claim 1, further comprising:
obtaining spectrum information about a RF spectrum;
determining a set of frequencies that provides RF compatibility with the RF distribution system in accordance with the spectrum information; and
configuring the first RF component and the second RF component in accordance with the set of frequencies.

11. The method of claim 1, wherein the detecting is indicative that the first RF component and the second RF component are configured for different frequency bands.

12. The method of claim 1, wherein the detecting is indicative that at least one RF component is not connected to another RF component.

13. An apparatus comprising:
a first radio frequency (RF) component;
a second RF component;
at least one processor; and
a memory having stored therein machine executable instructions, that when executed, cause the apparatus to:
instruct the first RF component of a RF distribution system to generate a generated signal through an RF port;
receive an indication from the second RF component when the generated signal is detected, the indication indicative that the first RF component and the second RF component are electrically connected through the RF port;
determine a next RF component based on a media access control (MAC) address;
repeat the instructing, the receiving, and the determining the next RF component steps for remaining RF components of the RF distribution system;
determine a RF configuration of the RF distribution system based on the instructing, the receiving, and the repeating steps;
automatically detect when an error occurs in the RF configuration of the RF distribution system; and
display a pictorial representation of the RF configuration with an error indication of the detected error.

14. The apparatus of claim 13, wherein a first processor is embedded in the first RF component and a second processor is embedded in the second RF component.

15. The apparatus of claim 13, further comprising:
a scanner scanning an RF spectrum and providing scanning results to the at least one processor; and
wherein the instructions further cause the apparatus to:
determine a set of frequencies from the scanning results to provide RF compatibility with the apparatus; and
configure the first RF component and the second RF component in accordance with the set of frequencies.

16. The apparatus of claim 13, wherein the first RF component modulates the signal by changing a DC voltage level of the signal.

17. The apparatus of claim 13, wherein the first RF component modulates the signal with a modulating signal, the modulating signal characterized by a tone.

18. The apparatus of claim 13, wherein the instructions further cause the apparatus to:
verify the determined RF configuration for operational consistency.

19. A non-transitory computer-readable storage medium storing computer-executable instructions that, when executed, cause a processor to perform a method comprising:
instructing a first radio frequency (RF) component of a RF distribution system to generate a modulated signal through an RF port;
receiving an indication from a second RF component when the modulated signal is detected, the indication indicative that the first RF component and the second RF component are electrically connected through the RF port;
determining a next RF component based on a device identifier;
repeating the instructing, the receiving, and the determining the next RF component for remaining RF components of the RF distribution system;
determining a RF configuration of the RF distribution system based on the instructing, the receiving, and the repeating;
in response to the determining, automatically detecting when a detected error occurs in the RF configuration of the RF distribution system; and
displaying a diagram of a representation of the RF configuration with an error indication of the detected error.

20. The computer-readable storage medium of claim 19, the method further comprising:
verifying the determined RF configuration for operational consistency.

21. The computer-readable storage medium of claim 19, the method further comprising:
verifying that each RF component is connected to a preceding RF component and a succeeding RF component through corresponding RF ports when each said RF component is not an endpoint of the RF configuration.

22. The computer-readable storage medium of claim 19, the method further comprising:
instructing a scanner to scan an RF spectrum;
receiving scanning results from the scanner;
responsive to the receiving, determining a set of frequencies that provides RF compatibility with the RF distribution system; and
configuring the first RF component and the second RF component in accordance with the set of frequencies.

23. A method comprising:
instructing a first radio frequency (RF) component of a RF distribution system to provide a generated signal through an RF port;
receiving an indication from a second RF component when the generated signal is detected, the indication indicative that the first RF component and the second RF component are electrically connected through the RF port;
repeating the instructing and the receiving steps for remaining RF components of the RF distribution system;
determining a RF configuration of the RF distribution system based on the instructing, the receiving, and the repeating steps;
in response to the determining, automatically detecting when a detected error occurs in the RF configuration of the RF distribution system, wherein the detected error is indicative of the first RF component and the second RF component cascaded together and of the first RF component and the second RF component operating at different frequency bands; and
displaying a graphical representation of the RF configuration with an error indication of the detected error.

* * * * *